(12) United States Patent
Ma et al.

(10) Patent No.: US 6,977,876 B2
(45) Date of Patent: Dec. 20, 2005

(54) APPARATUS FOR AND METHOD OF DETECTING DEFOCUS ERROR SIGNAL FOR OPTICAL PICKUP AND APPARATUS FOR AND METHOD OF DETECTING SEEK DIRECTION

(75) Inventors: Byung-in Ma, Suwon-si (KR); In-sik Park, Suwon-si (KR); Chong-sam Chung, Suwon-si (KR); Jin-hoon Jeon, Suwon-si (KR); Tae-yong Doh, Suwon-si (KR); Byoung-ho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 565 days.

(21) Appl. No.: 09/895,878

(22) Filed: Jul. 2, 2001

(65) Prior Publication Data

US 2002/0044505 A1 Apr. 18, 2002

(30) Foreign Application Priority Data

Oct. 12, 2000 (KR) ................................ 2000-60030

(51) Int. Cl.[7] .............................................. G11B 7/00
(52) U.S. Cl. ................................ 369/44.41; 369/44.25; 369/53.23
(58) Field of Search ........................ 369/44.41, 44.42, 369/44.23, 44.25, 44.26, 44.28, 53.2, 53.22, 369/53.23, 275.4, 94

(56) References Cited

U.S. PATENT DOCUMENTS

| | | | | |
|---|---|---|---|---|
| 4,920,527 A | * | 4/1990 | Maeda | 369/44.23 |
| 5,930,213 A | * | 7/1999 | Yamanaka | 369/44.41 |
| 6,418,095 B1 | * | 7/2002 | Sano et al. | 369/44.41 |
| 6,778,473 B1 | * | 8/2004 | Tomita et al. | 369/44.41 |

FOREIGN PATENT DOCUMENTS

| | | |
|---|---|---|
| CN | 1042440 | 5/1990 |
| CN | 1047584 | 5/1990 |
| JP | 2-35631 | 2/1990 |
| JP | 05-334693 | 12/1993 |
| JP | 10-097753 | 4/1998 |
| JP | 10-97753 | 4/1998 |

* cited by examiner

*Primary Examiner*—Thang V. Tran
(74) *Attorney, Agent, or Firm*—Stein, McEwen & Bui, LLP

(57) ABSTRACT

An apparatus for and a method of detecting a defocus error signal. First, second and third light receiving regions of a photodetector are arranged in a radial direction of a recording medium to independently perform photoelectric conversion with respect to incident light which is reflected/diffracted by the recording medium. A subtractor subtracts a sum signal of detection signals from the first and third light receiving regions and a detection signal of the second light receiving region to output a defocus error signal, to detect defocus and/or a change in thickness of the recording medium. The defocus error signal and a push-pull tracking error signal are compared in a state in which a predetermined amount of defocus is applied to a light spot to detect a seek direction of the recording medium having a land/groove structure.

17 Claims, 12 Drawing Sheets

APPARATUS FOR AND METHOD OF DETECTING DEFOCUS ERROR SIGNAL FOR OPTICAL PICKUP AND APPARATUS FOR AND METHOD OF DETECTING SEEK DIRECTION

CROSS-REFERENCE TO RELATED APPLICATIONS

This application claims the benefit of Korean Application No. 2000-60030 filed Oct. 12, 2000, in the Korean Patent Office, the disclosure of which is incorporated herein by reference.

BACKGROUND OF THE INVENTION

1. Field of the Invention

The present invention relates to an apparatus for and a method of detecting a defocus error signal for an optical pickup and an apparatus for and a method of detecting a seek direction of a recording medium having a land/groove structure adopting the same.

2. Description of the Related Art

For a recording medium of a next generation DVD family, that is, a recording medium requiring higher density recording than a recording medium of a DVD family, where information is recorded by being defocused, an effect of defocusing is much greater than other existing recording media which use a red laser beam. Thus, a method of compensating for defocusing is needed.

To accommodate high density recording, where a short wavelength light within a blue wavelength range (for example, 420 nm or less) and an objective lens having a numerical aperture (NA) greater than 0.6 are used, the depth of focus of an incident beam is shallow so that a margin for defocus is reduced. Accordingly, a small amount of defocus may be a problem in recording. For a recording medium of the next generation DVD (a so-called HD-DVD) family, a light source for emitting light having a wavelength shorter than a red wavelength and an objective lens having an NA of 0.6 or more are expected to be used.

Figure 1:
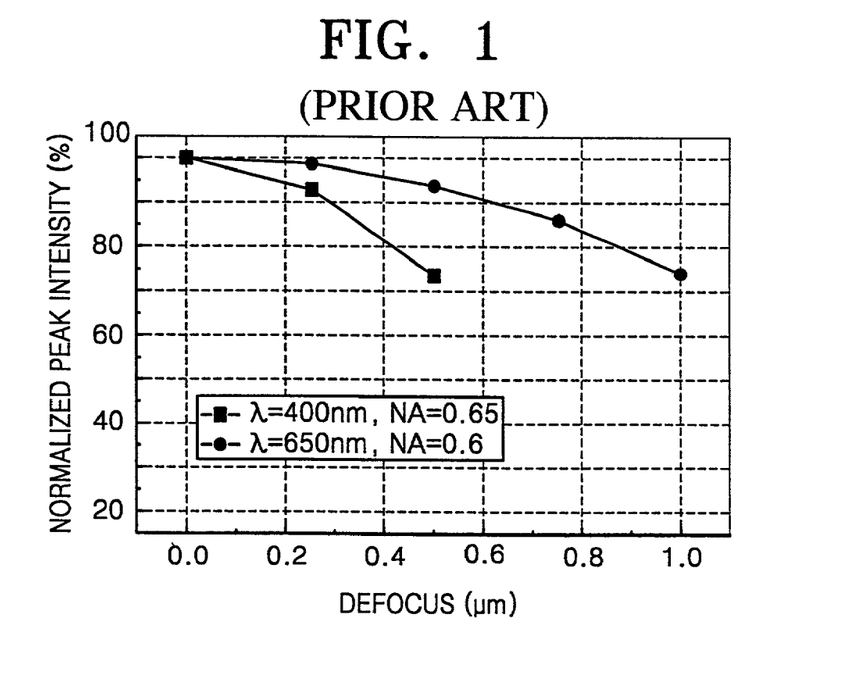
FIG. 1 is a graph indicating a change in intensity of a light spot formed on a recording medium according to defocus.

FIG. 1 shows a change in intensity of a light spot formed on a recording medium according to defocus. In FIG. 1, the horizontal axis denotes defocus and the vertical axis denotes normalized beam peak intensity. As defocus increases, the intensity of an incident beam having a 400 nm wavelength and an 0.65 NA sharply decreases relative to the intensity of an incident beam having a 650 nm wavelength and an 0.60 NA. Where recording is performed under these conditions, a mark having a desired length and width cannot be recorded. For incident beams having the same wavelength, as the NA increases, the intensity an incident beam is reduced according to defocus.

Figure 2:
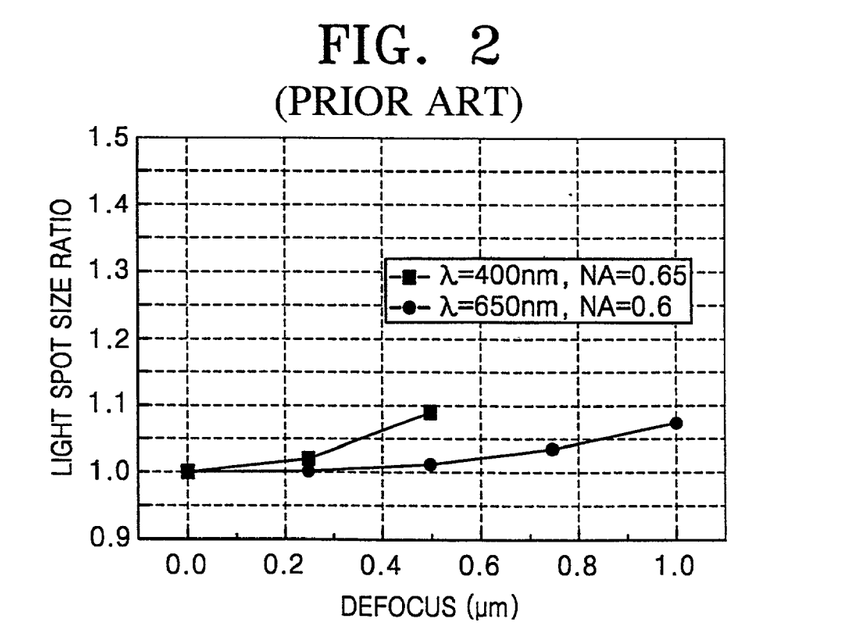
FIG. 2 is a graph indicating a change in size of a light spot formed on a recording medium according to defocus.

FIG. 2 shows a change in size of a light spot formed on a recording medium according to defocus. In FIG. 2, the horizontal axis denotes defocus and the vertical axis denotes light spot size ratio. As defocus increases, the spot size of a beam having a 400 nm wavelength increases more rapidly than a spot size of a beam having a 650 nm wavelength. Although the light beams have the same wavelength, as the NA increases, the spot size increases.

As well known in the field to which the present invention pertains, where a recording medium in a DVD family is recorded by using an objective lens having a 0.6 NA and a light beam having a 650 nm wavelength, control of defocus of about 230 nm is needed. However, for example, where a recording medium of a next generation DVD family is recorded by using a blue beam and an objective lens having a 0.85 NA, defocus should be controlled within tens of nanometers.

Thus, to finely control defocus within tens of nanometers where recording is performed with respect to the next generation DVD family, a defocus error signal, which is not affected by a tilt of a recording medium relative to an objective lens, detrack, and a shift of the objective lens needs to be detected.

SUMMARY OF THE INVENTION

To satisfy the above needs, it is an object of the present invention to provide an apparatus for and method of accurately detecting a defocus error signal which is minimally affected by a tilt of a recording medium, detrack, and a shift of an objective lens.

It is another object of the present invention to provide an apparatus having a simple structure for and a simple method of detecting a seek direction of a recording medium of a land/groove structure.

Additional objects and advantages of the invention will be set forth in part in the description which follows, and, in part, will be obvious from the description, or may be learned by practice of the invention.

Accordingly, to achieve the above and other objects of the invention, a defocus error signal detecting apparatus comprises a photodetector having first, second and third light receiving regions arranged in a radial direction of a recording medium, wherein each of the light receiving regions independently performs photoelectric conversion with respect to incident light which is reflected/diffracted by the recording medium, and a subtractor which subtracts a sum signal of detection signals from the first and third light receiving regions and a detection signal of the second light receiving region and outputs a defocus error signal to detect defocus and/or a change in thickness of the recording medium.

A method of detecting defocus error signals comprises generating first through third detection signals by dividing light reflected/diffracted by a recording medium and passing through an objective lens into first, second and third light regions in a direction corresponding to a radial direction of the recording medium, and detecting defocus error signals by subtracting a sum signal of the first and third detection signals and the second detection signal, so that defocus and/or a change in thickness of the recording medium are/is detected.

To achieve the another object of the invention, a seek direction detecting apparatus comprises a photodetector having first through fourth light receiving regions arranged in a direction corresponding to a radial direction of a recording medium, where each of the light receiving regions independently performs photoelectric conversion with respect to incident light reflected/diffracted by a recording medium having a land/groove structure. A signal processor comprises a first subtractor which subtracts a sum signal of detection signals from the first and fourth light receiving regions and a sum signal of detection signals from the second and third light receiving regions and outputs a defocus error signal. A second subtractor subtracts a sum signal of detection signals from the first and second light receiving regions and a sum signal of detection signals from the third and fourth light receiving regions and outputs a push-pull tracking error signal. A comparison-judgement portion compares the defocus error signal and the push-pull tracking error signal and outputs a seek direction detection signal.

A method of detecting a seek direction comprises irradiating light including a predetermined amount of defocus to a recording medium, generating first, second, third and fourth detection signals by dividing light reflected/diffracted by the recording medium and passing through an objective lens into first, second, third and fourth light regions in a direction corresponding to a radial direction of the recording medium, detecting a defocus error signal by subtracting a sum signal of the first and fourth detection signals and a sum signal of the second and third detection signals, detecting a push-pull tracking error signal by subtracting a sum signal of the first and second detection signals and a sum signal of the third and fourth detection signals, and generating a seek direction detection signal by comparing the defocus error signal and the push-pull tracking error signal.

In the present invention, the recording medium may be a DVD-RAM disc or a land/groove type next generation DVD-RAM disc.

BRIEF DESCRIPTION OF THE DRAWINGS

The above objects and advantages of the present invention will become more apparent by describing in detail an embodiment thereof with reference to the attached drawings in which.

DESCRIPTION OF THE PREFERRED EMBODIMENTS

Reference will now be made in detail to the present embodiments of the present invention, examples of which are illustrated in the accompanying drawings, wherein like reference numerals refer to like elements throughout.

Figure 3A:
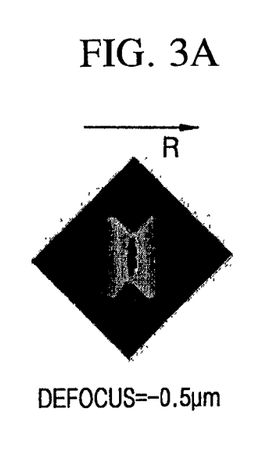
FIGS. 3A through 3E show distributions of intensity of a light spot according to a change in defocus formed on a land/groove type next generation DVD-RAM disc.
Figure 3B:
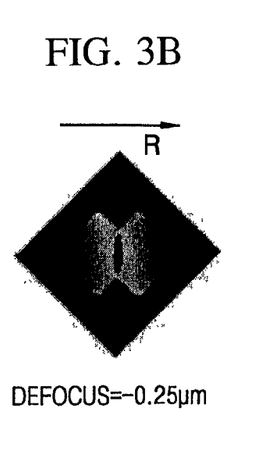
Figure 3C:
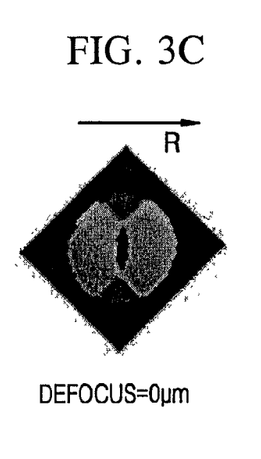
Figure 3D:
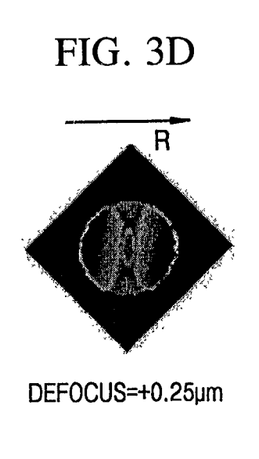
Figure 3E:
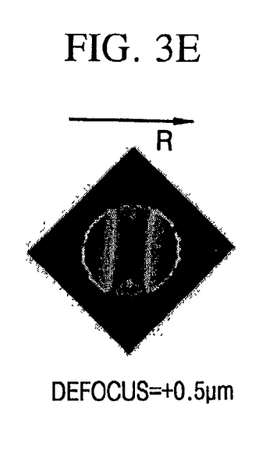

FIGS. 3A through 3E show distributions of intensity of light spots having a 400 nm wavelength ($\lambda$) according to an amount of defocus where the light spots are formed by using an objective lens having a 0.65 NA on a land/groove type next generation DVD-RAM disc having a track pitch of 0.34 μm and a groove depth of $\lambda/6$. In FIGS. 3A through 3E, the horizontal direction and the vertical direction signify a radial direction and a tangential direction of a recording medium, respectively. As shown in FIGS. 3A through 3B, light spot intensity varies between a central portion and a peripheral portion of the light spot in a radial direction on a next generation DVD-RAM disc according to the amount of defocus. The intensity variation is approximately opposite with respect to a (+) defocus and a (−) defocus.

A characteristic feature of the present invention is that a defocus error signal is detected considering the change in distribution of the intensity of a light spot reflected/diffracted by a recording medium according to the direction of defocus as shown in FIGS. 3A through 3E, and that a seek direction is detected with respect to a land/groove type recording medium by using the detected defocus error signal.

That is, in the present invention, the defocus error signal is detected by dividing light reflected/diffracted by the recording medium and passing through an objective lens into first, second and third light regions. The light is divided in a direction corresponding to the radial direction. The defocus error signal is generated by subtracting a sum signal of signals detected from the first and third light regions and a signal detected from the second light region.

Figure 4:
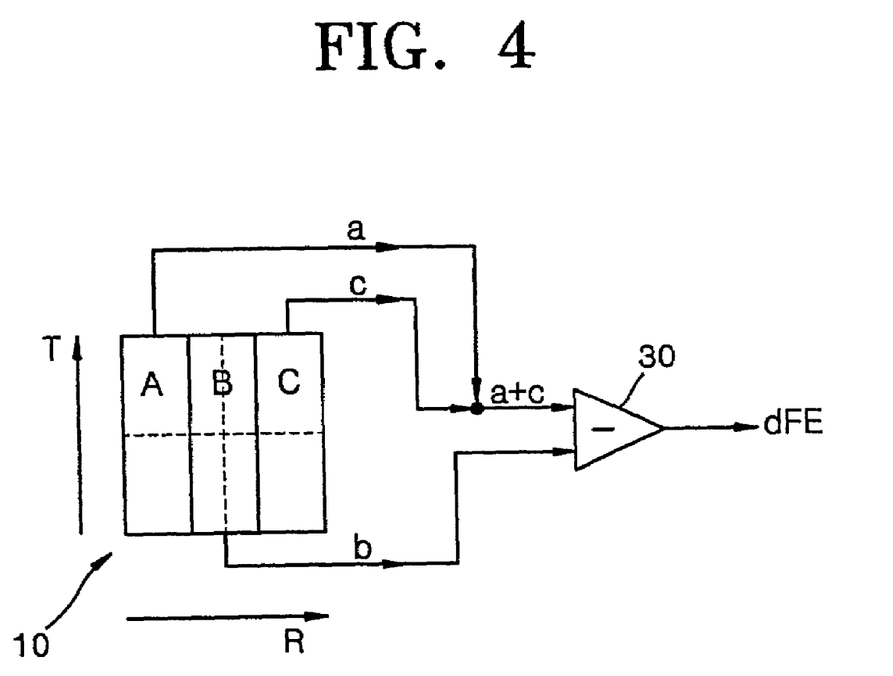
FIG. 4 illustrates an apparatus for detecting a defocus error signal for an optical pickup according to an embodiment of the present invention.

Referring to FIG. 4, a defocus error signal detecting apparatus according to a preferred embodiment of the present invention comprises a photodetector 10 having first, second and third light receiving regions A, B and C separately arranged in a direction R corresponding to the radial direction of a recording medium (not shown), and a subtractor 30 which subtracts a sum signal (a+c) of signals a and c detected from the light receiving regions A and C and a signal b detected from the second light receiving region B and outputs a defocus error signal dFE.

Assuming that the direction of an information stream recorded on a recording medium is a tangential direction, a radial direction is perpendicular to the tangential direction.

Each of the first, second and third light receiving regions A, B and C of the photodetector 10 is narrow in a direction R corresponding to the radial direction and wide in a direction T corresponding to the tangential direction. The light reflected/diffracted by the recording medium and incident on the first, second and third light receiving regions A, B and C independently undergoes a photoelectric conversion and the first, second and third detection signals a, b and c are output.

The photodetector 10 may divided into eight sections as indicated by dotted lines shown in FIG. 4, so that the photodetector 10 may be used as a photodetector for detecting information signals recorded on the recording medium. The A and C sections are each subdivided in the tangential direction into two sections and the B section is subdivided in both the radial and tangential directions into four sections. The defocus error signal detecting apparatus according to the present invention is simplified by using a photodectector suitable for detecting information signals of an optical pickup and a main beam irradiated on the recording medium for recording/reproduction.

The defocus error detecting apparatus detects the defocus error signal dFE sufficiently considering a change in distribution of intensity according to defocus of a light spot formed on the recording medium. Thus, an accurate defocus detection is accomplished without being affected by radial tilt, tangential tilt, detrack, and objective lens shift. Further, the defocus error signal dFE indicates a change in thickness of the recording medium where no defocus is generated in the optical pickup adopting the defocus error signal detecting apparatus.

Thus, by using the defocus error signal detecting apparatus of the present invention, defocus and a change in thickness are detected with respect to a next generation DVD-RAM disc of a land/groove type which requires a fine defocus control. Therefore, where the defocus error signal apparatus of the present invention is adopted, defocus is finely controlled and an error according to a change in thickness of a recording medium may be corrected.

FIGS. 5A through 5F are graphs showing the defocus error signals dFE detected by the defocus error signal detecting apparatus according to the present invention where a light spot is formed on a land of a land/groove type recording medium. FIGS. 6A through 6F are graphs showing the defocus error signals dFE detected by the defocus error signal detecting apparatus according to the present invention where a light spot is formed on a groove of a land/groove type recording medium.

FIG. 5A through 6F show examples where light having a wavelength λ of 400 nm is focused by an objective lens having an NA of 0.65 and forms a light spot on a land/groove type next generation DVD-RAM disc having a track pitch of 0.34 μm and a groove depth of λ/6, and light reflected from the DVD-RAM disc is detected by the defocus error signal detecting apparatus according to the present invention.

FIGS. 5A through 5E show the defocus error signal dFE output from the defocus error signal detecting apparatus of FIG. 4 in response to a light spot formed at a land according to radial tilt, tangential tilt, defocus, detrack and objective lens shift, respectively. Likewise, FIGS. 6A through 6E show the defocus error signal dFE output from the defocus error signal detecting apparatus of FIG. 4 in response to a light spot formed at a groove according to radial tilt, tangential tilt, defocus, detrack and objective lens shift, respectively.

Figure 5A:
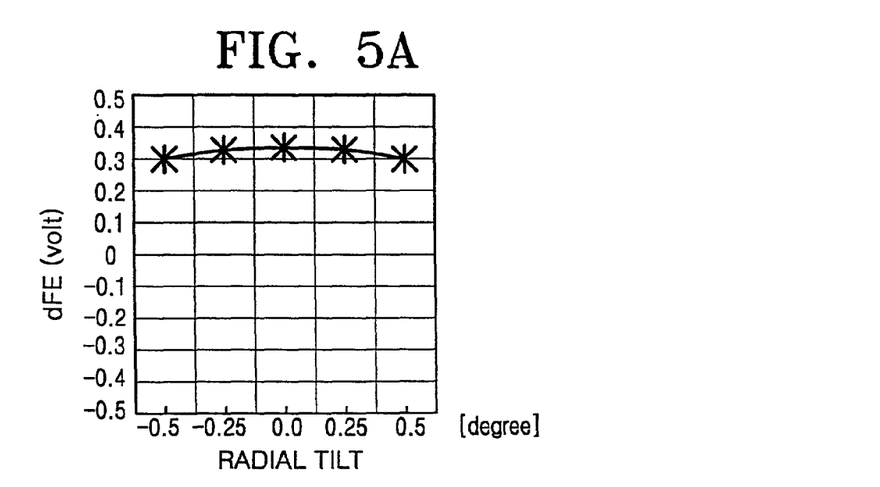
FIGS. 5A through 5F are graphs indicating defocus error signals (dFE) output from the defocus error signal detecting apparatus of FIG. 4 in response to a light spot formed at a land according to radial tilt, tangential tilt, defocus, detrack, objective lens shift, and recording medium thickness change, respectively.
Figure 5B:
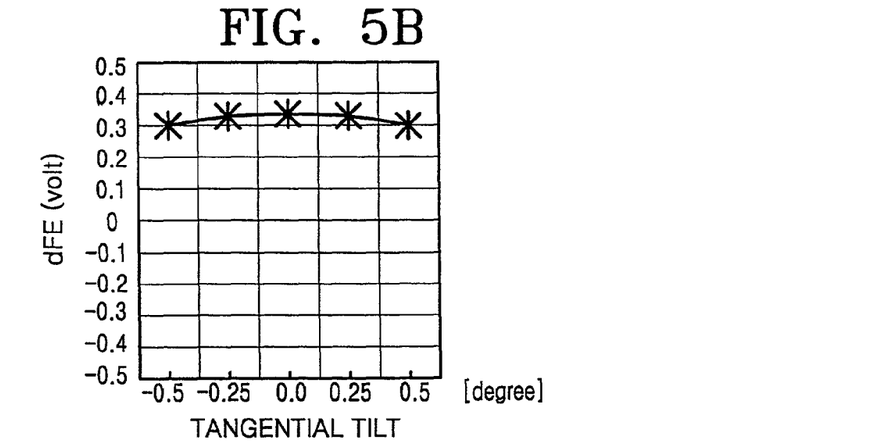
Figure 5C:
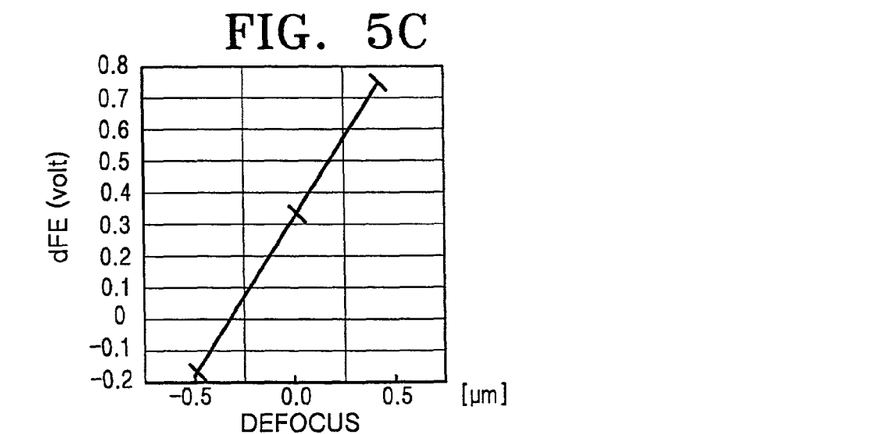
Figure 5D:
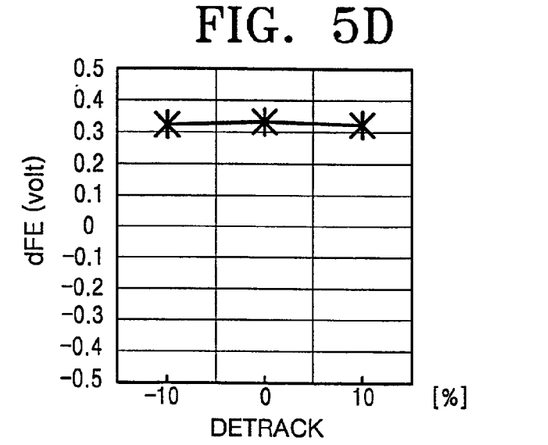
Figure 5E:
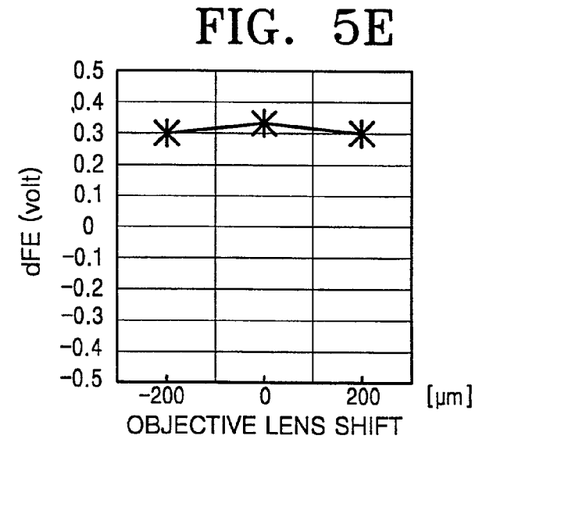
Figure 5F:
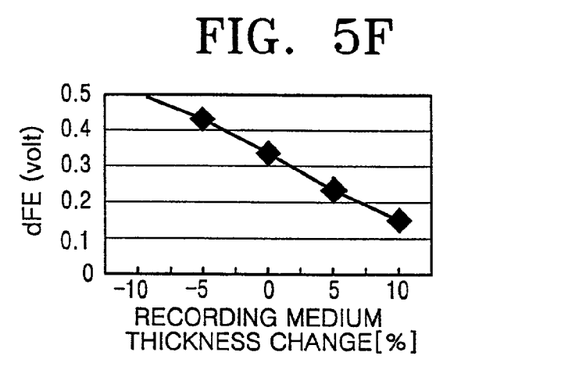
Figure 6A:
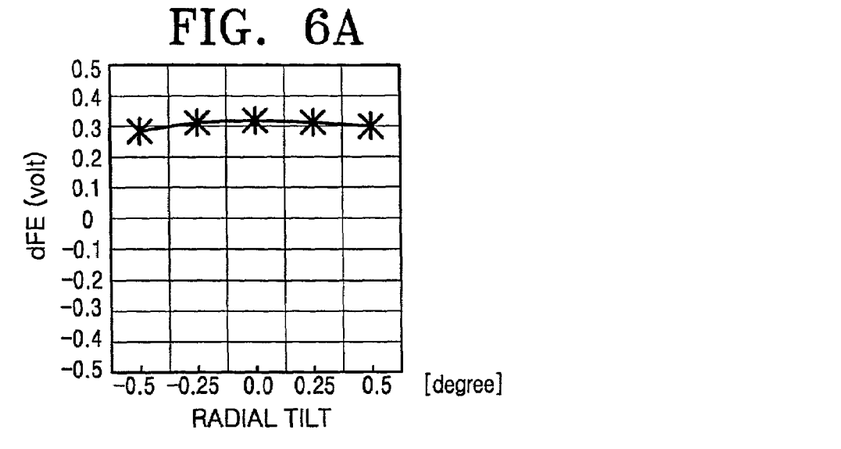
FIGS. 6A through 6F are graphs indicating defocus error signals (dFE) output from the defocus error signal detecting apparatus of FIG. 4 in response to a light spot formed at a groove according to radial tilt, tangential tilt, defocus, detrack, objective lens shift, and recording medium thickness change, respectively.
Figure 6B:
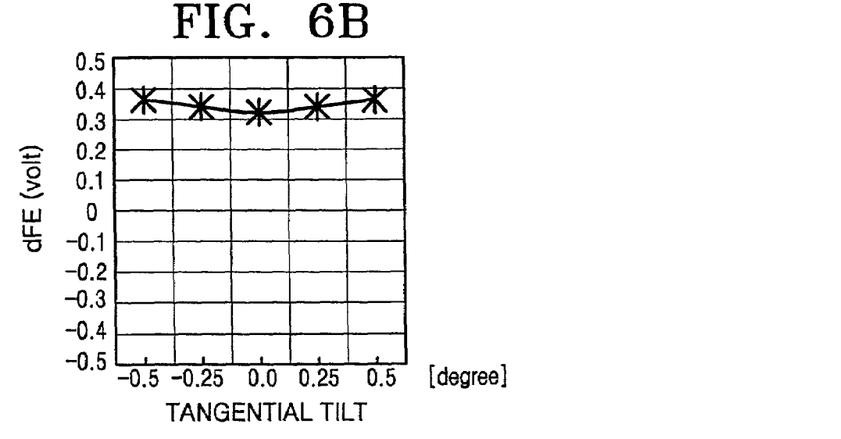
Figure 6C:
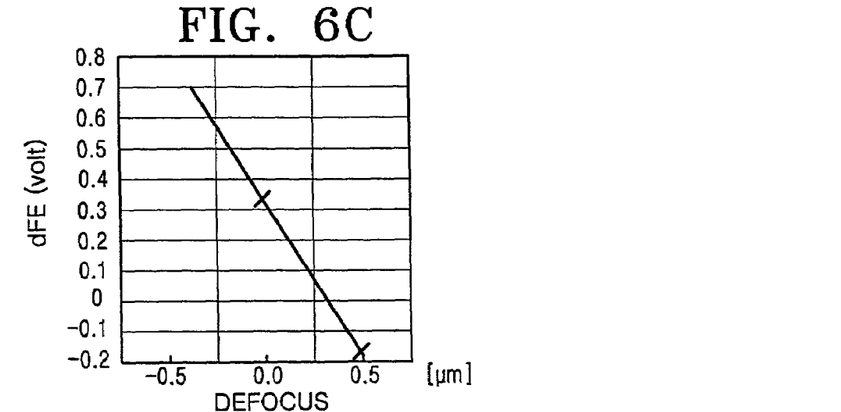
Figure 6D:
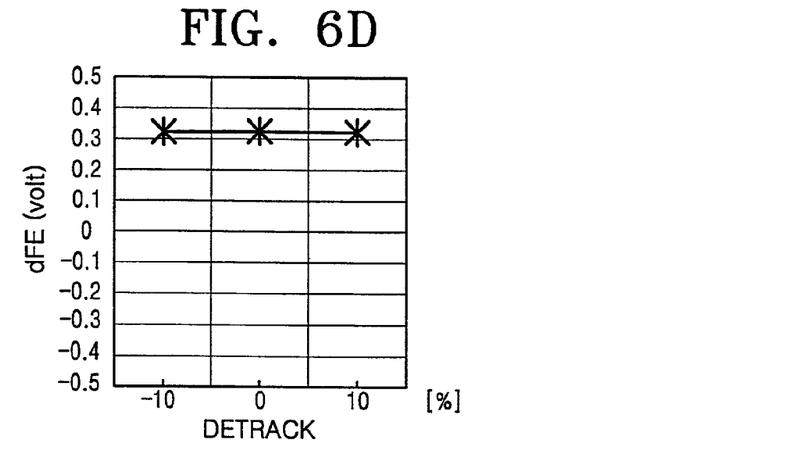
Figure 6E:
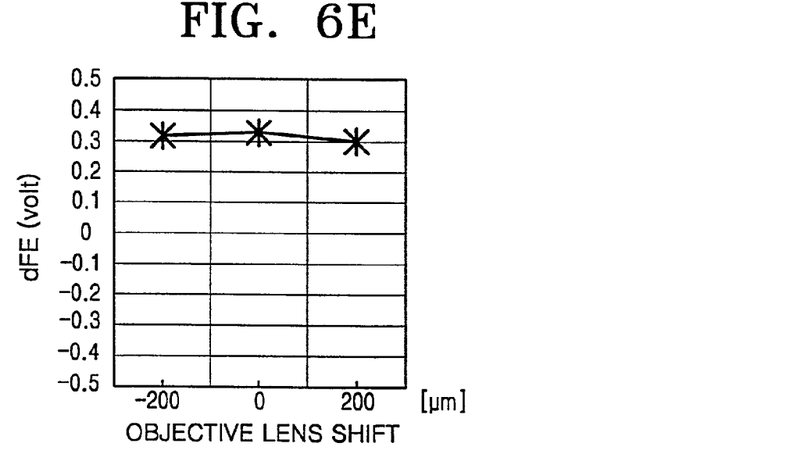
Figure 6F:
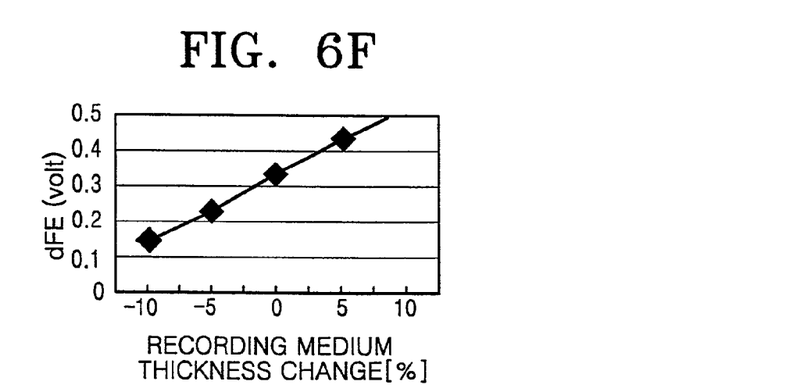

FIGS. 5F and 6F show a change of the defocus error signal dFE output from the defocus error signal detecting apparatus of FIG. 4 according to a change in thickness of a recording medium in a land area and a groove area, respectively. In FIGS. 5D and 6D, values of detrack in a horizontal axis are indicated in percentage (%) of a degree of detrack with respect to a track pitch. In FIGS. 5F and 6F, a change in thickness with respect to a reference thickness (for example, 0.4 mm) of a recording medium is indicated in percentage As shown in FIGS. 5C and 6C, the slope of the defocus error signal dFE according to an amount of defocus is opposite for a land and a groove; and, as shown in FIGS. 5F and 6F, the slope of the defocus error signal dFE as a function of recording thickness medium change is also opposite for a land and a groove. Further, as can be seen from FIGS. 5A through 5F and 6A through 6F, the defocus error signal dFE is sensitive only to generation of defocus and a change in thickness of a recording medium and is minimally affected by radial tilt, tangential tilt, detrack and objective lens shift. In FIGS. 5C, 5F, 6C and 6F, the defocus error signal dFE has some offset and the offset is removable by adjusting a split ratio of the first through third light receiving regions A, B and C.

Thus, by using the defocus error signal detecting apparatus according to the present invention, defocus is accurately detected to finely control defocus where information is recorded on or reproduced from a recording medium such as a next generation DVD-RAM disc having a land/groove structure.

The detected defocus error signal dFE is used to adjust defocus such that the defocus error signal dFE equals zero (dFE=0) in an on-track state and a peak-to-peak value of the defocus error signal dFE becomes a minimum in an off-track state. That is, the defocus error signal detecting apparatus is used to detect the amount of defocus existing on a focus loop and to adjust an optical system so that defocus is minimized. In an on-track state, a point where defocus is minimized is a DC level of a peak-to-peak value of the defocus error signal dFE detected in an off-track state or a value assigned by a system which includes the defocus error signal detection apparatus. In an off-track state, a point where defocus is minimized is a point where a peak-to-peak value of the defocus error signal dFE is minimum.

Since a change in thickness of a recording medium is precisely and accurately detectable, an error according to a change in thickness of the recording medium may be finely corrected. As shown in FIGS. 5F and 6F, a change of 5% is readily detectable.

The defocus error signal detecting apparatus described with reference to FIG. 4 is suitable where the photodetector 10 is installed at an exit pupil of an objective lens. Where an optical device such as a lens and/or a holographic optical element affecting distribution of intensity of light reflected/diffracted by the recording medium is inserted between the objective lens and the photodetector 10, the defocus error signal detecting apparatus according to the present invention comprises a photodetector which is modified corresponding to a change in distribution of intensity of light caused by the inserted optical device. Accordingly, the defocus error signal detecting apparatus comprises a signal processor having a modified structure for detecting a defocus error signal. However, the structure of such a signal processor is also one which subtracts a sum signal of the first and second detection signals and a second detection signal from the first through third detection signals detected by dividing light reflected/diffracted by the recording medium and passing through the objective lens into the first through third light regions in a direction R corresponding to a radial direction.

According to the present invention, a seek direction is detected by using a detected defocus error signal. That is, light defocused by a predetermined amount by defocusing an objective lens (not shown) of an optical pickup is irradiated on a recording medium having a land/groove structure, for example, a next generation DVD-RAM disc. Light reflected/diffracted by the recording medium and passing through the objective lens is detected by being divided into first through fourth light regions in a direction corresponding to a radial direction of the recording medium. First through fourth detection signals are detected from the first through fourth light regions, respectively. A sum signal of the first and fourth detection signals and a sum signal of the second and third signals are subtracted to detect the defocus error signal dFE. A push-pull tracking error signal TEpp is detected by subtracting a sum signal of the first and second detection signals and a sum signal of the third and fourth signals. Finally, a seek direction is detected by comparing the defocus error signal dFE and the push-pull tracking error signal TEpp.

Figure 7:
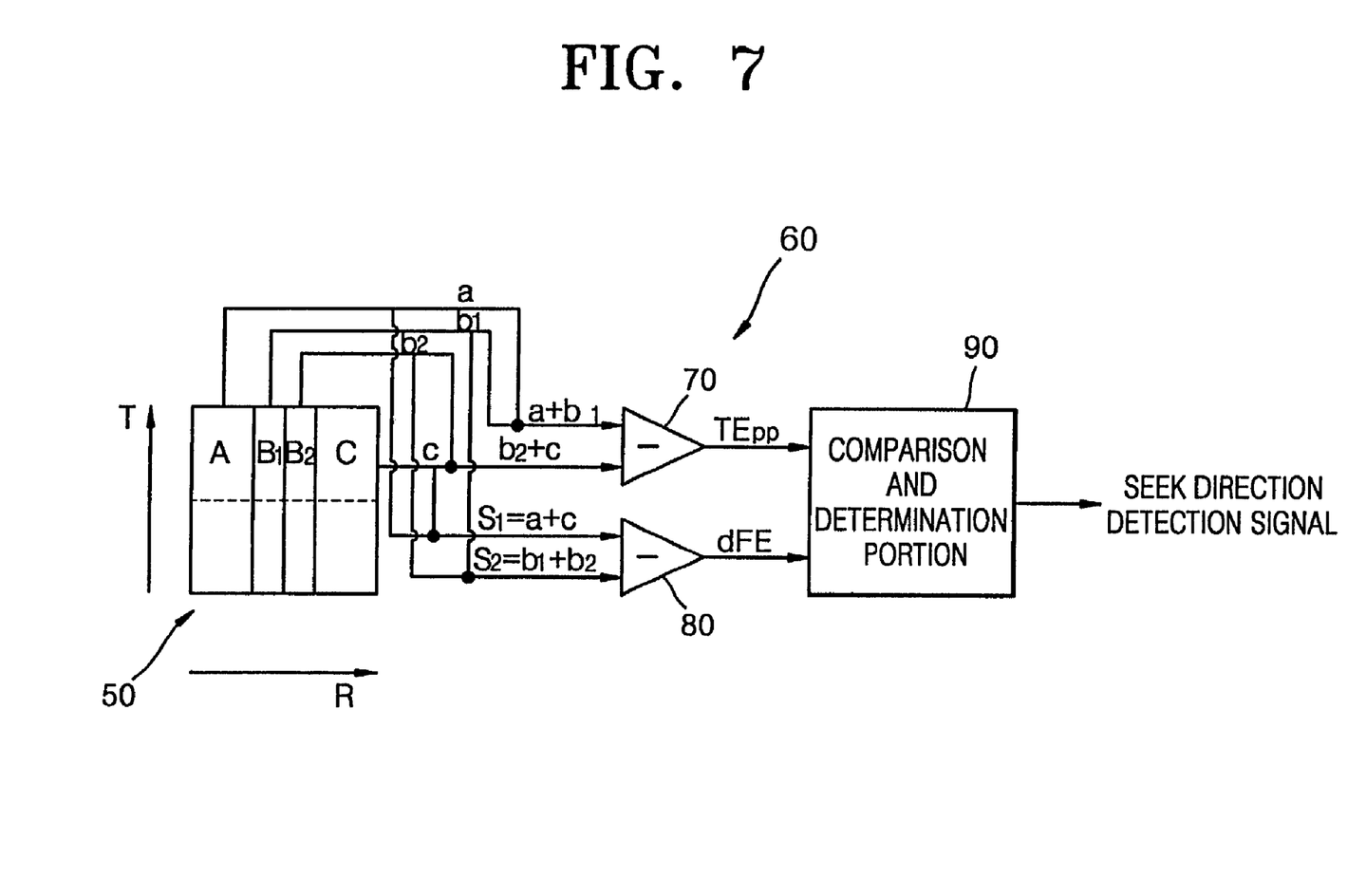
FIG. 7 illustrates a seek direction detecting apparatus adopting the defocus error signal detecting apparatus according to the present invention.

Referring to FIG. 7, a seek direction detecting apparatus according to the present invention comprises a photodetector 50 having first through fourth light receiving regions A, B1, B2 and C which are arranged in a direction R corresponding to a radial direction of a recording medium having a land/groove structure. A signal processor 60 detects a seek direction from detection signals from the first through fourth light receiving regions A, B1, B2 and C. The seek direction detecting apparatus is operated in a state in which a predetermined amount of defocus is generated to a light spot formed on the recording medium.

The first through fourth light receiving regions A, B1, B2 and C of the photodetector 50 each independently perform photoelectric conversion with respect to light incident thereon and output first, second, third and fourth detection signals a, b1, b2 and c. The first and fourth light receiving regions A and C of the photodetector 50 are substantially the same as the first and third light receiving regions A and C of the photodetector 10 of FIG. 4. The second and third light receiving regions B1 and B2 of the photodetector 50 correspond to the second light receiving region B of the photodetector 10 of FIG. 4 where the light receiving region B of FIG. 4 is divided into two sections in the direction R corresponding to the radial direction of the recording medium, the divided sections corresponding to the second and third receiving regions B1 and B2.

Thus, the photodetector 50 is preferably an octal structure where the first through fourth light receiving regions A, B1, B2 and C are divided as illustrated by a dotted line in a direction T corresponding to a tangential direction of the recording medium, as shown in FIG. 7, so that the photodetector 50 has eight sections. The seek direction detecting apparatus according to the present invention uses a photodetector which detects information signals of a optical pickup and a main light irradiated to a recording medium for recording/reproduction.

The signal processor 60 includes a first subtractor 70 which subtracts a sum signal (a+b1) of the first and second detection signals a and b1 and a sum signal (b2+c) of the third and fourth detection signals b2 and C and outputs a push-pull tracking error signal TEpp, a second subtractor 80 which subtracts a sum signal (S1=a+c) of the first and fourth detection signals a and c and a sum signal (S2=b1+b2) of the second and third detection signals b1 and b2 and outputs a defocus error signal dFE, and a comparison and determination portion 90 which compares the push-pull tracking error signal TEpp and the defocus error signal dFE to generate a seek direction detection signal.

Since the defocus error signal dFE includes a DC level (offset), the comparison and determination portion 90 removes a DC component by AC coupling the defocus error signal dFE, binarizes the AC-coupled defocus error signal dFE with respect to a central value thereof or a predetermined DC value, and compares the binarized push-pull tracking error signal TEpp and the binarized defocus error signal dFE to generate the seek direction detection signal.

The seek direction detecting apparatus described with reference to FIG. 7, is suitable where the photodetector 50 is installed at the exit pupil of an objective lens (not shown). Where an optical device such as a lens and/or a holographic optical element affecting the distribution of intensity of light reflected/diffracted by the recording medium is inserted between the objective lens and the photodetector 50, the seek direction detecting apparatus comprises a photodetector having a structure modified to correspond to a change in distribution of intensity of light caused by the inserted optical device. Where an optical device affecting the distribution of intensity of light is inserted between the objective lens and the photodetector 50, the signal processor 60 also detects a seek direction by comparing the detected defocus error signal dFE and the push-pull tracking error signal TEpp.

In the seek direction detecting apparatus the sum signals S1 and S2, the push-pull tracking error signal TEpp, and the defocus error signal dFE according to a degree of defocus included in a light spot formed on a recording medium in an off-track state are shown in FIGS. 8A through 10B.

Figure 8A:
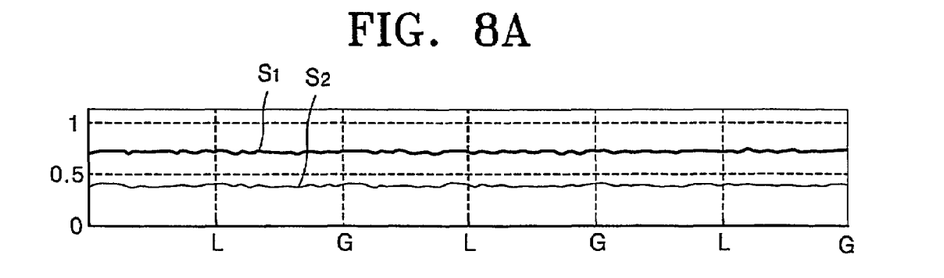
FIG. 8A is a graph showing sum signals S1 and S2 detected by the seek direction detecting apparatus of FIG. 7 where defocus is not generated at a light spot formed on a recording medium.
Figure 8B:
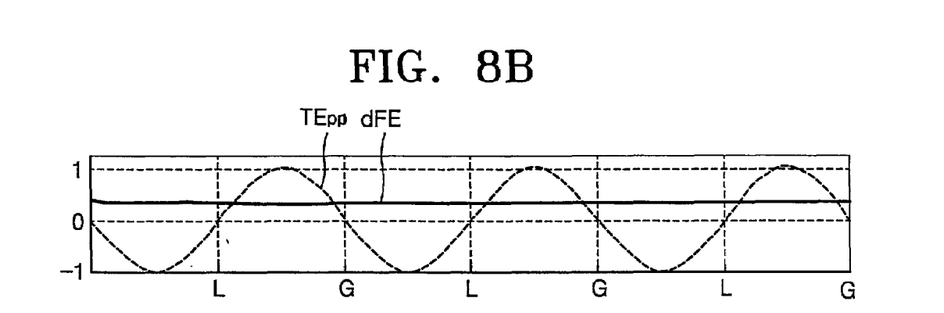
FIG. 8B is a graph showing a defocus error signal dFE and a push-pull tracking error signal TEpp detected by the seek direction detecting apparatus of FIG. 7 where defocus is not generated at a light spot formed on the recording medium.

Referring to FIGS. 8A and 8B, where defocus is not generated to a light spot formed on a recording medium, the sum signals S1 and S2 and the defocus error signal dFE do not significantly vary with respect to a seek (a track seek) in a radial direction of the light spot. Alternating symbols L and G indicate the radial direction.

Figure 9A:
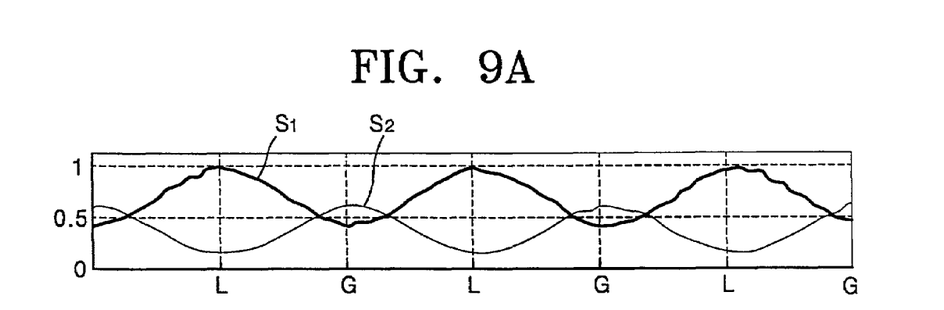
FIG. 9A is a graph showing sum signals S1 and S2 detected by the seek direction detecting apparatus of FIG. 7 where defocus of −0.5 μm is included in a light spot formed on a recording medium.
Figure 9B:
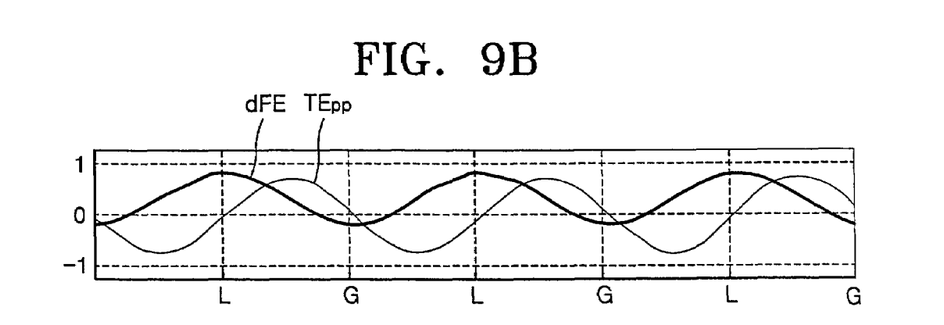
FIG. 9B is a graph showing a defocus error signal dFE and a push-pull tracking error signal TEpp detected by the seek direction detecting apparatus of FIG. 7 where defocus of −0.5 μm is included in a light spot formed on the recording medium.

Referring to FIG. 9A, where defocus of −0.5 $\mu$m is included in a light spot formed on a recording medium, the sum signals S1 and S2 vary as the light spot moves along the radial direction. A difference between the values of the sum signals S1 and S2 becomes greater at a land L and relatively small at a groove G. The defocus error signal dFE obtained by subtracting the sum signals S1 and S2, as shown in FIG. 9B, varies as the light spot moves along the radial direction so that a difference between S1 and S2 becomes maximum at the lands L and minimum at the grooves G. The defocus error signal dFE maintains a phase difference of about +90° or −90° with respect to the push-pull tracking error signal TEpp.

Figure 10A:
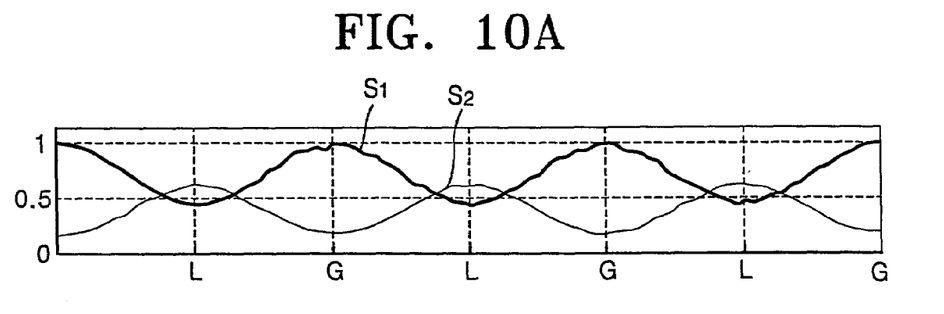
FIG. 10A is a graph showing sum signals S1 and S2 detected by the seek direction detecting apparatus of FIG. 7 where defocus of +0.5 μm is included in a light spot formed on a recording medium.
Figure 10B:
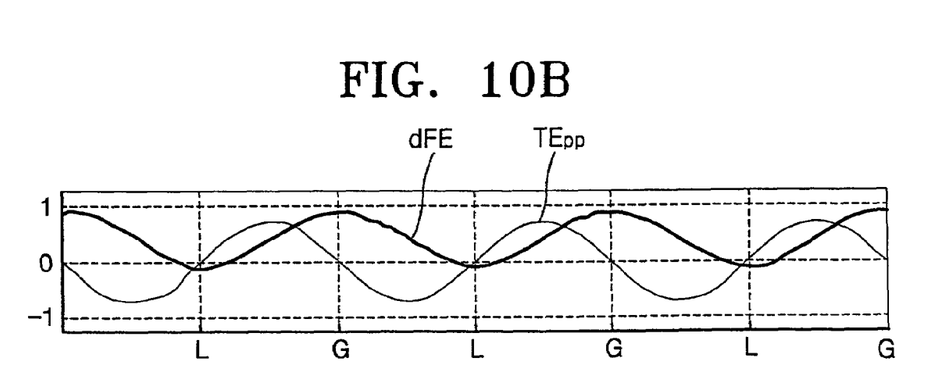
FIG. 10B is a graph showing a defocus error signal dFE and a push-pull tracking error signal TEpp detected by the seek direction detecting apparatus of FIG. 7 where defocus of +0.5 μm is included in a light spot formed on a recording medium.

Referring to FIG. 10A, where defocus of +0.5 $\mu$m is included in a light spot formed on a recording medium, the sum signals S1 and S2 vary as the light spot moves along the radial direction. A difference between the sum signals S1 and S2 is greater at the grooves G than at the lands L, in contrast with FIG. 9A. As shown in FIG. 10B, the defocus error signal dFE obtained by subtracting the sum signals S1 and S2 becomes a minimum at the lands L and a maximum at the grooves G, as the light spot moves along the radial direction, in contrast with FIG. 9B. Also, the defocus error signal dFE maintains a phase difference of about +90° or −90° with respect to the push-pull tracking error signal TEpp.

As shown in FIGS. 8A through 10B, the defocus error signal dFE indicating the maximum or minimum values at the lands L and the grooves G according to the amount and direction of defocus included in a light spot is detected. Also, a phase difference of about +90° or −90° exists between the defocus error signal dFE and the push-pull tracking error signal TEpp. Thus, a comparison between the defocus error signal dFE and the push-pull tracking error signal TEpp is readily obtained.

Figure 11:
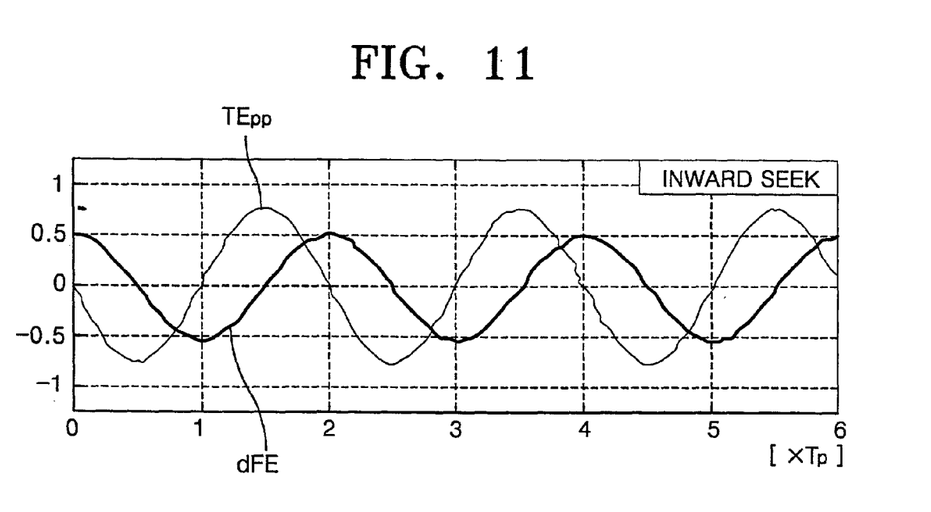
FIG. 11 is a graph showing a push-pull tracking error signal TEpp and a defocus error signal dFE detected by the seek direction detecting apparatus of FIG. 7 where a light spot which is defocused by 10–15% seeks inwardly in a radial direction of a recording medium.
Figure 12:
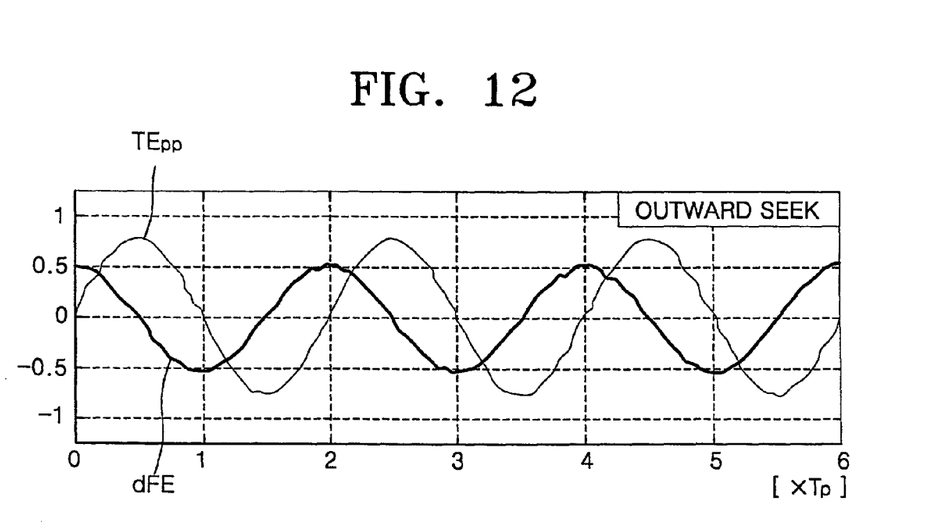
FIG. 12 is a graph showing a push-pull tracking error signal TEpp and a defocus error signal dFE detected by the seek direction detecting apparatus of FIG. 7 where a light spot which is defocused by 10–15% seeks outwardly in a radial direction of a recording medium.

FIGS. 11 and 12 are graphs showing the push-pull tracking error signal TEpp and the defocus error signal dFE output from the first and second subtractors 70 and 80, respectively, where a light spot including a 10–15% defocus seeks inwardly and outwardly, respectively, along the radial direction of a recording medium. A horizontal axis interval XTp is obtained by normalizing a track pitch Tp which is a distance between the center of a land and the center of a groove. In FIGS. 11 and 12, the values indicated along the horizontal direction signify distances corresponding to multiples of the track pitch Tp. For example, where a point "0" in the horizontal axis indicates the center of a groove, a point "1" indicates the center of a land which is the next track.

As shown in FIGS. 11 and 12, the push-pull tracking error signal TEpp and the defocus error signal dFE maintain a phase difference of +90° or −90° according to the direction of seek. FIGS. 11 and 12 show the push-pull tracking error signal TEpp and the defocus error signal dFE when defocus of about 10–15% is applied to a light spot. A value of the defocus error signal dFE becomes about 50% of a tracking error signal TEpp0 in a normal state where there is no defocus while the push-pull tracking error signal TEpp becomes about 74% of the tracking error signal TEpp0 in the normal state.

Figure 13:
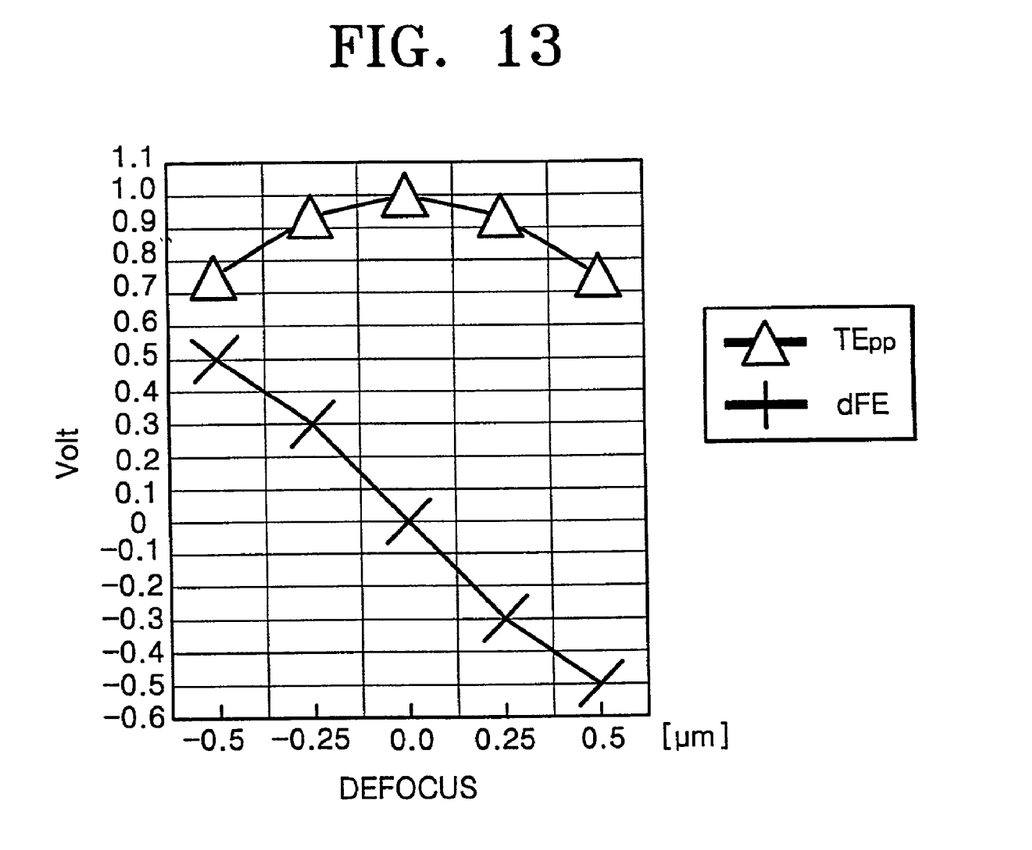
FIG. 13 is a graph showing a peak-to-peak value of a push-pull tracking error signal TEpp and a defocus error signal dFE detected by the seek direction detecting apparatus of FIG. 7 in an off track state.

FIG. 13 shows the push-pull tracking error signal TEpp and the defocus error signal dFE according to defocus. As shown in FIG. 13, the push-pull tracking error signal TEpp is minimally affected by defocus compared with a variation of the defocus error signal dFE according to defocus. In FIG. 13, TEpp is a peak-to-peak value of the tracking error signal detected in an off-track state and dFE is a peak-to-peak value of a defocus error signal according to defocus in the off-track state.

In the seek direction detecting apparatus according to the present invention, a predetermined amount of defocus is generated to a light spot formed on a recording medium. Then, the defocus error signal dFE and the push-pull tracking error signal TEpp are detected and compared so that a precise and accurate seek direction is detected.

Also, for example, where a seek is performed in a state in which +0.5 μm defocus is applied as shown in FIG. 10B, the value of the defocus error signal dFE at a land position is detected to be less than where defocus is not applied (FIG. 8B) while the value of the defocus error signal dFE at a groove position is detected to be greater than where defocus is not applied. Where a seek is performed where defocus is applied in an opposite direction, i.e., −0.5 μm (FIG. 9A), opposite results are obtained. Thus, a land/groove is determined by using the defocus error signal dFE detected where a seek is performed in a state in which a predetermined amount of defocus is applied.

In summary the present invention may be applied to a recording medium having a land/groove structure of various specifications. For example, according to the present invention, the defocus error signal dFE and/or seek direction are detected with respect to a DVD-RAM disc having a track pitch of 0.615 μm, for example, by using an objective lens having a 0.6 NA. As other examples, the present invention may be applied to a recording medium having a track pitch of 0.34 μm using an objective lens having a 0.65 NA, and to a recording medium having a land/groove structure having a track pitch of 0.3 μm or less using an objective lens having a 0.8 or more NA. That is, by using the present invention, the defocus error signal dFE and/or seek direction are detected with respect to a next generation DVD-RAM disc. Further, by using the present invention, a land/groove of a recording medium having a land/groove structure may be determined.

According to the present invention, a defocus error signal which sensitively changes with respect to a change in defocus and/or thickness of a recording medium is detected without being affected by a relative tilt of the recording medium with respect to an objective lens, detrack and a shift of the objective lens. Thus, by using the defocus error signal, defocus may be precisely controlled and a change in thickness of the recording medium may be detected.

Furthermore, where the defocus error signal and the push-pull tracking error signal according to the present invention are briefly compared in a state in which a predetermined amount of defocus is applied to a light spot, a seek direction of the recording medium having a land/groove structure may be detected. Also, a land/groove may be determined by using the defocus error signal detected in a state in which a predetermined amount of defocus is applied to a light spot.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A seek direction detecting apparatus comprising:
   a photodetector having first, second, third and fourth light receiving regions arranged in a direction corresponding to a radial direction of a recording medium to independently perform photoelectric conversion with respect to incident light reflected/diffracted by the recording medium and to output first, second, third and fourth detection signals, respectively; and
   a signal processor comprising:
      a first subtractor which subtracts a sum of the first and fourth detection signals and a sum of the second and third detection signals, to generate a first error signal,
      a second subtractor which subtracts a sum of the first and second detection signals and a sum of the third and fourth detection signals to generate a second error signal, and
      a comparator which compares the first error signal and the second error signal to generate a seek direction detection signal.

2. The apparatus as claimed in claim 1, wherein:
   the first through fourth light receiving regions of the photodetector are each divided in a direction corresponding to a tangential direction of the recording medium to form eight light receiving regions; and
   the eight light receiving regions are used to detect information signals recorded on the recording medium.

3. The apparatus as claimed in claim 1, wherein the recording medium is a DVD-RAM disc or a land/groove type next generation DVD-RAM disc.

4. A method of detecting a seek direction on a recording medium, the method comprising:
  irradiating light including a predetermined amount of defocus on the recording medium;
  dividing the light reflected/diffracted by the recording medium into first, second, third and fourth light regions corresponding to a radial direction of the recording medium;
  generating first, second, third and fourth detection signals corresponding to the first, second, third and fourth light regions, respectively;
  subtracting a sum of the first and fourth detection signals and a sum of the second and third detection signals, to generate a first error signal;
  subtracting a sum of the first and second detection signals and a sum of the third and fourth detection signals, to generate a second error signal; and
  comparing the first error signal and the second error signal, to generate a seek direction error signal.

5. The method as claimed in claim 4, wherein the recording medium is a DVD-RAM disc or a land/groove type next generation DVD-RAM disc.

6. A method of generating error signals for controlling optical recording/reproduction from an optical disc, the method comprising:
  generating first, second, third and fourth detection signals, the first and second detection signals corresponding respectively to light reflected/refracted from radially inward and radially outward portions of a light spot formed on the optical disc, and the third and fourth detection signals corresponding to light reflected/refracted from first and second central portions of the light spot;
  subtracting a sum of the first and second detection signals and a sum of the third and fourth detection signals to generate a defocus error signal;
  subtracting a sum of the first and third detection signals and a sum of the second and fourth detection signals to generate a push-pull tracking error signal; and
  comparing the defocus error signal and the push-pull tracking error signal to generate a seek direction error signal.

7. The method of claim 6, wherein the comparing comprises:
  binarizing the defocus error signal with respect to a predetermined DC value;
  binarizing the push-pull tracking error signal; and
  comparing the binarized defocus error signal and the binarized push-pull tracking error signal to generate the seek direction error signal.

8. The method of claim 6 further comprising:
  AC coupling the defocus error signal prior to the binarizing of the defocus error signal.

9. A method of determining whether a light spot is formed on a land or a groove of an optical disc, the method comprising:
  defocusing the light spot by a predetermined amount;
  generating first, second, third and fourth detection signals, the first and second detection signals corresponding respectively to light reflected/refracted from radially inward and radially outward portions of the light spot formed on the optical disc, and the third and fourth detection signals corresponding to light reflected/refracted from first and second central portions of the light spot;
  subtracting a sum of the first and second detection signals and a sum of the third and fourth detection signals to output a subtraction result;
  determining that the light spot is formed on a land of the optical disc if the subtraction result is greater than a predetermined value; and
  determining that the light spot is formed on a groove of the optical disc if the subtraction result is less than a predetermined value.

10. An apparatus for detecting error signals for recording to or reproducing from an optical recording medium, the apparatus comprising:
  a photodetector which generates a plurality of detection signals, wherein first and second of said plurality of detection signals correspond to light reflected/refracted from radially inward and radially outward portions, respectively, of a light spot formed on the recording medium and third and fourth detection signals corresponding to light reflected/refracted from radially inward and radially outward portions, respectively, of a central portion of the light spot;
  a first subtractor which subtracts a sum of the first and second detection signals and a sum of the third and fourth detection signals to output a first error signal;
  a second subtractor which subtracts a sum of the first and third detection signals and a sum of the second and fourth detection signals to generate a second error signal; and
  a comparator which compares the first and second error signals to generate a seek direction error signal.

11. The apparatus of claim 10, wherein the optical recording medium comprises a DVD-RAM disc having a track pitch of about 0.615 µm.

12. The apparatus of claim 10, wherein the optical recording medium comprises a DVD-RAM disc having a track pitch of about 0.34 µm.

13. The apparatus of claim 10, wherein the optical recording medium comprises a land/groove structure having a track pitch of not more than 0.3 µm.

14. The apparatus of claim 13, wherein where the light spot is formed on a land, a slope of a plot of the first error signal according to an amount of defocus is positive.

15. The apparatus of claim 13, wherein where the light spot is formed on a groove, a slope of a plot of the first error signal according to an amount of defocus is negative.

16. The apparatus of claim 13, wherein where the light spot is formed on a land, a slope of a plot of the first error signal according to recording medium thickness is negative.

17. The apparatus of claim 13, wherein where the light spot is formed on a land, a slope of a plot of the first error signal according to recording medium thickness is positive.

* * * * *